US010329422B2

(12) United States Patent
Li et al.

(10) Patent No.: US 10,329,422 B2
(45) Date of Patent: Jun. 25, 2019

(54) FLAME RETARDANT LASER DIRECT STRUCTURING MATERIALS

(71) Applicant: SABIC Global Technologies B.V., Bergen op Zoom (NL)

(72) Inventors: Yanjun Frank Li, Shanghai (CN); Jiru Meng, Shanghai (CN); Xiangping David Zou, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/673,583

(22) Filed: Aug. 10, 2017

(65) Prior Publication Data

US 2017/0342263 A1 Nov. 30, 2017

Related U.S. Application Data

(60) Division of application No. 13/923,782, filed on Jun. 21, 2013, now Pat. No. 10,119,021, which is a continuation-in-part of application No. 12/468,474, filed on May 19, 2009, now Pat. No. 8,492,464.

(60) Provisional application No. 61/055,631, filed on May 23, 2008.

(51) Int. Cl.
| | |
|---|---|
| C08L 69/00 | (2006.01) |
| C08K 3/22 | (2006.01) |
| C08K 5/521 | (2006.01) |
| C08K 3/32 | (2006.01) |
| C08L 47/00 | (2006.01) |
| C08K 5/00 | (2006.01) |
| C08L 71/12 | (2006.01) |
| C08L 25/04 | (2006.01) |
| B41M 5/24 | (2006.01) |
| B41M 5/26 | (2006.01) |
| C08K 5/5399 | (2006.01) |

(52) U.S. Cl.
CPC ............... *C08L 69/00* (2013.01); *C08K 3/22* (2013.01); *C08K 3/32* (2013.01); *C08K 5/0066* (2013.01); *C08K 5/521* (2013.01); *C08L 25/04* (2013.01); *C08L 47/00* (2013.01); *C08L 71/12* (2013.01); *B41M 5/24* (2013.01); *B41M 5/267* (2013.01); *C08K 5/5399* (2013.01); *C08K 2003/2251* (2013.01)

(58) Field of Classification Search
None
See application file for complete search history.

(56) References Cited

U.S. PATENT DOCUMENTS

| | | |
|---|---|---|
| 4,154,775 A | 5/1979 | Axelrod |
| 4,579,906 A | 4/1986 | Zabrocki et al. |
| 5,521,230 A | 5/1996 | Bhatia et al. |
| 5,717,018 A | 2/1998 | Magerstedt et al. |
| 5,976,411 A | 11/1999 | Feng et al. |
| 6,207,344 B1 | 3/2001 | Ramlow et al. |
| 6,308,142 B1 | 10/2001 | Choate et al. |
| 6,448,316 B1 | 9/2002 | Hirano et al. |
| 6,458,879 B1 | 10/2002 | Grutke et al. |
| 6,638,669 B2 | 10/2003 | Schneider et al. |
| 7,029,825 B2 | 4/2006 | Yokota et al. |
| 7,083,848 B2 | 8/2006 | Kliesch et al. |
| 7,098,266 B2 | 8/2006 | Weber et al. |
| 7,105,591 B2 | 9/2006 | Weber et al. |
| 7,112,365 B2 | 9/2006 | Kliesch et al. |
| 7,163,987 B2 | 1/2007 | Weber et al. |
| 7,165,172 B1 | 1/2007 | Hamilton et al. |
| 7,261,944 B2 | 8/2007 | Kliesch et al. |
| 2002/0134771 A1 | 9/2002 | Wenger et al. |
| 2003/0109612 A1 | 6/2003 | Seidel et al. |
| 2003/0166761 A1 | 9/2003 | Weber et al. |
| 2004/0241422 A1 | 12/2004 | Naundorf et al. |
| 2004/0259996 A1 | 12/2004 | Stoppelmann et al. |
| 2005/0064711 A1 | 3/2005 | Kliesch et al. |
| 2005/0069688 A1 | 3/2005 | Kliech et al. |
| 2005/0163987 A1 | 7/2005 | Kliesch et al. |
| 2006/0286365 A1* | 12/2006 | Lee .................. C23C 18/02 428/323 |
| 2007/0161746 A1 | 7/2007 | Weber |
| 2008/0114103 A1 | 5/2008 | Hoeks et al. |
| 2008/0227920 A1 | 9/2008 | Weber et al. |
| 2009/0048373 A1* | 2/2009 | Clauss ................ B41M 5/267 524/86 |
| 2011/0251326 A1 | 10/2011 | Van Hartingsveldt et al. |
| 2014/0002311 A1 | 1/2014 | Takano et al. |

FOREIGN PATENT DOCUMENTS

| | | |
|---|---|---|
| EP | 0755977 A2 | 1/1997 |
| EP | 0542115 A1 | 5/2003 |

(Continued)

OTHER PUBLICATIONS

CN 103160104 A; Publication date: Jun. 19, 2013; Abstract, 1 page.
Patent Cooperation Treaty, International Searching Authority; Search Report; PCT/IB2014/062542; dated Jan. 16, 2015; 7 pages.
Patent Cooperation Treaty, International Searching Authority; Written Opinion; PCT/IB2014/062542; dated Jan. 16, 2015; 9 pages.
XP-002734232; WPI/Thomson; CN103160104; Publication Date: Jun. 19, 2013; 4 pages.
EP Opposition letter dated Apr. 7, 2014, 13 pgs.

(Continued)

*Primary Examiner* — Robert T Butcher
(74) *Attorney, Agent, or Firm* — Cantor Colburn LLP

(57) ABSTRACT

Flame retardant thermoplastic compositions that are capable of being used in a laser direct structuring process. The compositions include a thermoplastic resin, a laser direct structuring additive, and a flame retardant. The compositions offer flame retardant characteristics while also substantially maintaining the mechanical properties of the base thermoplastic resin, such as the impact strength and/or HDT of the composition. The compositions can be used in a variety of applications such as personal computers, notebook and portable computers, cell phone and other such communications equipment.

14 Claims, No Drawings

(56) References Cited

FOREIGN PATENT DOCUMENTS

| GB | 2043083 A | | 10/1980 |
|---|---|---|---|
| WO | 2004108783 A1 | | 12/2004 |
| WO | 2005103113 A1 | | 11/2005 |
| WO | 2006042715 A1 | | 4/2006 |
| WO | WO 2006/042715 | * | 4/2006 |
| WO | 2007079156 A2 | | 7/2007 |
| WO | 2009024496 A1 | | 2/2009 |
| WO | 2009141799 A1 | | 11/2009 |
| WO | 2009141800 A2 | | 11/2009 |
| WO | 2014096153 A1 | | 6/2014 |

OTHER PUBLICATIONS

UL94 Vertical Burning Test Report; Report No. 122494; Date Issued: Feb. 12, 2013; 3 pgs.
UL94 Vertical Burning Test Report; Report No. 140136; Date Issued: Feb. 21, 2014, 3 pgs.
A. Radeck, "Thermoplastic Polyesters for Laser Direct Structuring" URL: https://techcenter.lanxess.com/scp/emea/de/media/Thermplastic%20Polyester%20for63480>; retrived on Aug. 26, 2009, pp. 1-7.
BASF SE "Product Information Ultramid® T 4381 LDS"; BASF The Chemical Company; May 2005; 2 pages.
BASF: Ultramid® T 4381 LDS; BASF The Chemical Company Aug. 2012; 6 pages.
H. Luo et al., "News Release: First Pleastic Chip Antenna Developed with BASF's Laser-Strucutrble Polyamide" BASF The Chemical Company; Apr. 22, 2008; 4 pages.
M. Huske et al., "Laser Support Activation and Additive Metallization of Thermoplastics for 3D-Mids" Proceeding of the 3rd LANE 2001, Aug. 28-31, 2001; Erlangen Germany,; pp. 1-12.
Naundorf et al., "A Fundamentally New Mechanism for Additive Metallization of Polymeric Substrates in Ultra Fine Line Technology Illustrated for 3D-MIDSs"; Galvanotechnik Sep. 2000, vol. 91, No. 9, pp. 2449-2451.
International Search Report; International Application No. PCT/IB2009/052137; International Filing Date: May 21, 2009; dated Sep. 8, 2009; 5 pages.
Written Opinion of the International Searching Authority; International Application No. PCT/IB2009/052137; International Filing Date: May 21, 2009; dated Sep. 8, 2009; 9 pages.

* cited by examiner

FLAME RETARDANT LASER DIRECT STRUCTURING MATERIALS

CROSS REFERENCE TO RELATED APPLICATIONS

The present application is a divisional of U.S. non-provisional application Ser. No. 13/923,782, filed Jun. 21, 2013, which is a continuation-in-part of U.S. Non-Provisional patent application Ser. No. 12/468,474 filed May 19, 2009, which claims priority to U.S. Provisional Patent Application No. 61/055,631 filed May 23, 2008, the contents of which in their entirety are incorporated herein by.

FIELD OF THE INVENTION

The present invention relates to thermoplastic compositions and in particular to flame retardant thermoplastic compositions capable of being used in a laser direct structuring process. The present invention also relates to methods of manufacturing these compositions and articles that include these compositions.

BACKGROUND OF THE INVENTION

Electrical components may be provided as molded injection devices (MID) with desired printed conductors, i.e., when manufactured in MID technology, using different methods, e.g., a masking method, in two-component injection molding with subsequent electroplating (or electroless plating), because for some cases, chemical plating is used for 2-component injection molding. In contrast to conventional circuit boards made of fiberglass-reinforced plastic or the like, MID components manufactured in this way are three-dimensional molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller, and lowers the manufacturing costs by reducing the number of assembly and contacting steps. These MID devices have great utility in cell phones, PDAs and notebook applications.

Stamp metal, flexible printed circuit board (FPCB) mounted and two-shot molding methods are three existing technologies to make an MID. However, stamping and FPCB mounted process have limitations in the pattern geometry, and the tooling is expensive and also altering of a RF pattern causes high-priced and time-consuming modifications into tooling. 2-shot-molding (two-component injection molding) processes have been used to produce 3D-MIDs with real three-dimensional structures. The antenna can be formed with subsequent chemical corrosion, chemical surface activation and selective metal coating. This method involves high initial costs and is only economically viable for large production numbers. 2-shot-molding is also not environmentally friendly process. All these three methods are tool-based technologies, which have limited flexibility, long development cycles, difficult prototype, expensive design changes, and limited miniaturization.

Accordingly, it is becoming increasingly popular to form MIDs using a laser direct structuring (LDS) process. In an LDS process a computer-controlled laser beam travels over the MID to activate the plastic surface at locations where the conductive path is to be situated. With a laser direct structuring process, it is possible to obtain conductive path widths of 150 microns or less. In addition, the spacing between the conductive paths can also be 150 microns or less. As a result, MIDs formed from this process save space and weight in the end-use applications. Another advantage of laser direct structuring is its flexibility. If the design of the circuit is changed, it is simply a matter of reprogramming the computer that controls the laser.

Polycarbonate resins (PC), or polymer alloys produced by blending one of these with a styrene resin, such as an ABS resin (acrylonite/butadiene/styrene copolymer), are widely used in electrical and electronic parts, personal computers, notebook and portable computers, cell phone and other such communications equipment. Market trends for these applications include short development cycle, variation of design, cost reduction, miniaturization, diversification and functionality. Internal antenna is one of the key components for these products during the applications. As such, it would be beneficial for MIDs to be formed using a PC resin to enable it to be used in these types of applications.

In addition, in the design of certain applications, such as notebook antennas, a flame retardancy of V0 is often required. Some of the current flame retardant additives used can adversely mechanical properties in polycarbonate materials, such as the heat deformation temperature (HDT) and/or impact strength. Therefore, providing a flame retardant composition that has sufficient mechanical properties while also being capable of being used in a laser direct structuring process has proven difficult.

Accordingly, it would be beneficial to provide a flame retardant thermoplastic composition that is capable of being used in a laser direct structuring process. It would also be beneficial to provide a polycarbonate-based flame retardant composition that is capable of being used in a laser direct structuring process while providing one or more benefits of using polycarbonate-based resins. It would also be beneficial to provide a method of making a flame retardant thermoplastic composition that is capable of being used in a laser direct structuring process as well as providing an article of manufacture, such as an antenna, that includes a flame retardant thermoplastic composition that is capable of being used in a laser direct structuring process.

BRIEF SUMMARY OF THE INVENTION

Described herein is a flame retardant thermoplastic composition capable of being used in a laser direct structuring process. The compositions include a thermoplastic resin, a laser direct structuring additive and a flame retardant. The compositions are capable of being used in a laser direct structuring process while also providing good flame retardant characteristics and while also maintaining beneficial mechanical properties. These compositions can be used in a variety of products such as, for example, electrical and electronic parts, personal computers, notebook and portable computers, cell phone and other such communications equipment.

Accordingly, in one embodiment, a thermoplastic composition comprises from 15 to 85% by weight of a thermoplastic resin, wherein the thermoplastic resin comprises a poly(arylene ether), a poly(arylene ether)/polystyrene blend, or a combination comprising at least one of the foregoing resins; from 0.1 to 30% by weight of a laser direct structuring additive; and 20% or less by weight of a flame retardant; wherein a molded sample of the thermoplastic composition is capable of achieving UL94 V0 rating at a thickness of 1.6 mm (±10%).

In one embodiment, a thermoplastic composition comprises from 15 to 85% by weight of a thermoplastic resin, wherein the thermoplastic resin comprises a polyamide resin; from 0.1 to 30% by weight of a laser direct structuring additive; and 20% or less by weight of a flame retardant; wherein a molded sample of the thermoplastic composition is capable of achieving UL94 V0 rating at a thickness of 1.6 mm (±10%).

In another embodiment, a method of forming a thermoplastic composition comprises the step of: blending in an extruder: from 15 to 85% by weight of a thermoplastic resin, wherein the thermoplastic resin comprises a poly(arylene ether), a poly(arylene ether)/polystyrene blend, or a combination comprising at least one of the foregoing resins; from 0.1 to 15% by weight of a laser direct structuring additive; and 20% or less by weight of a flame retardant; wherein a molded sample of the thermoplastic composition is capable of achieving UL94 V0 rating at a thickness of 1.6 mm (±10%).

In another embodiment, a method of forming a thermoplastic composition comprises the step of: blending in an extruder: from 15 to 85% by weight of a thermoplastic resin, wherein the thermoplastic resin comprises a polyamide resin; from 0.1 to 15% by weight of a laser direct structuring additive; and 20% or less by weight of a flame retardant; wherein a molded sample of the thermoplastic composition is capable of achieving UL94 V0 rating at a thickness of 1.6 mm (±10%).

These and other features and characteristics are more particularly described below.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" can include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language corresponds to the precision of an instrument for measuring the value.

The present invention provides a flame retardant thermoplastic composition capable of being used in a laser direct structuring process. The compositions include a thermoplastic resin, a laser direct structuring additive, and a flame retardant. The compositions offer flame retardant characteristics while also substantially maintaining the mechanical properties of the base thermoplastic resin. The compositions can be used in a variety of electrical and electronic parts, personal computers, notebook and portable computers, cell phone and other such communications equipment.

The flame retardant thermoplastic compositions of the present invention, and articles made using these compositions, have excellent physical properties as compared to prior art materials. As has been discussed, higher levels of flame retardant have been used in prior art compositions to achieve excellent flame retardant characteristics. The higher levels of flame retardant have an adverse impact on HDT and/or impact properties. The compositions of the present invention have overcome these problems through the use of a laser direct structuring (LDS) additive that not only enables the compositions to be capable of being used in an LDS process, the additive also acts as a synergist in increasing the flame retardance of the compositions. The LDS additive permits flame retardant characteristics to be maintained despite lower levels of flame retardant while the lower levels of flame retardant permit the compositions, and molded samples of these compositions, to have higher HDT and/or impact strength. As a result, a molded sample of the thermoplastic composition is capable of achieving UL94 V0 or V1 rating at a thickness of 1.5 mm (±10%) or thinner despite lower levels of flame retardant being used.

In one aspect, the thermoplastic compositions of the present invention use a thermoplastic resin as the base for the composition. Examples of thermoplastic resins that can be used in the present invention include, but are not limited to, polycarbonate-based resins, such as polycarbonate or a polycarbonate/acrylonitrile-butadiene-styrene resin blend; a poly(arylene ether) resin, such as a polyphenylene oxide resin, a poly(arylene ether) resin/polystyrene resin blend, a polyamide resin, or a combination including at least one of the foregoing resins.

Accordingly, in one embodiment, the flame retardant thermoplastic composition comprises a polycarbonate-based resin. The polycarbonate-based resin can be selected from a polycarbonate or a resin blend that includes a polycarbonate. Accordingly, in one embodiment, polycarbonates can be used as the base resin in the composition. Polycarbonates including aromatic carbonate chain units include compositions having structural units of the formula (I):

in which the $R^1$ groups are aromatic, aliphatic or alicyclic radicals. Beneficially, $R^1$ is an aromatic organic radical and, in an alternative embodiment, a radical of the formula (II):

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates can be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators can be added either singly or in admixture to the reactant mixture. Branching agents, described forthwith can also be added singly or in admixture.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

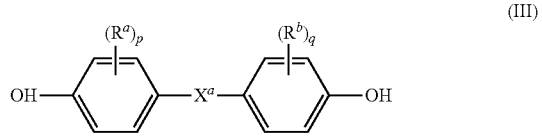

wherein $R^a$ and $R^b$ each independently represent hydrogen, a halogen atom, or a monovalent hydrocarbon group; p and q are each independently integers from 0 to 4; and $X^a$ represents one of the groups of formula (IV):

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that can be represented by formula (IV) include the bis(hydroxyaryl) alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis(hydroxyaryl)cycloalkane series such as, 1,1-bis(4-hydroxyphenyl)cyclopentane, 1,1-bis(4-hydroxyphenyl)cyclohexane, or the like, or combinations including at least one of the foregoing bisphenol compounds.

Other bisphenol compounds that can be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

wherein, $R^f$, is a halogen atom of a hydrocarbon group having 1 to 10 carbon atoms or a halogen substituted hydrocarbon group; n is a value from 0 to 4. When n is at least 2, $R^f$ can be the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations including at least one of the foregoing bisphenol compounds.

Bisphenol compounds such as 2,2,2',2'-tetrahydro-3,3,3',3'-tetramethyl-1,1'-spirobi-[1H-indene]-6,6'-diol represented by the following formula (VI) can also be used.

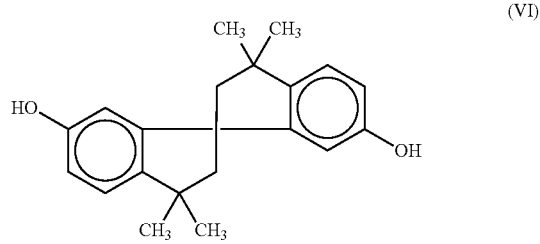

In one embodiment, the bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. In one embodiment, the carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is selected for use. Generally, useful aliphatic diacids have about 2 to about 40 carbons. A beneficial aliphatic diacid is dodecanedioic acid.

Branched polycarbonates, as well as blends of linear polycarbonate and a branched polycarbonate can also be used in the composition. The branched polycarbonates can be prepared by adding a branching agent during polymerization. These branching agents can include polyfunctional organic compounds containing at least three functional groups, which can be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations including at least one of the foregoing branching agents. The branching agents can be added at a level of about 0.05 to about 2.0 weight percent (wt %), based upon the total weight of the polycarbonate in a given layer.

In one embodiment, the polycarbonate can be produced by a melt polycondensation reaction between a dihydroxy compound and a carbonic acid diester. Examples of the carbonic acid diesters that can be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, bis (methylsalicyl)carbonate, diethyl carbonate, dimethyl carbonate, dibutyl carbonate, dicyclohexyl carbonate, or the like, or combinations including at least one of the foregoing carbonic acid diesters. In one embodiment, the carbonic acid diester is diphenyl carbonate or bis (methylsalicyl)carbonate.

Beneficially, the number average molecular weight of the polycarbonate is 3,000 to 1,000,000 grams/mole (g/mole). Within this range, it is beneficial to have a number average molecular weight of greater than or equal to 10,000 in one embodiment, greater than or equal to 20,000 in another embodiment, and greater than or equal to 25,000 g/mole in yet another embodiment. Also beneficial is a number average molecular weight of less than or equal to 100,000 in one embodiment, less than or equal to 75,000 in an alternative embodiment, less than or equal to 50,000 in still another alternative embodiment, and less than or equal to 35,000 g/mole in yet another alternative embodiment.

"Polycarbonates" includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

In another embodiment, the polycarbonate-based resin used in the thermoplastic composition includes a polycarbonate resin blend, such that a polycarbonate is blended with another resin. In one embodiment, the polycarbonate-based resin includes a blend of a polycarbonate with a polystyrene polymer. Examples include polycarbonate/acrylonitrile-butadiene-styrene resin blends.

The term "polystyrene" as used herein includes polymers prepared by bulk, suspension and emulsion polymerization, which contain at least 25% by weight of polymer precursors having structural units derived from a monomer of the formula (VII):

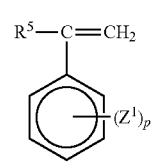

wherein $R^5$ is hydrogen, lower alkyl or halogen; $Z^1$ is vinyl, halogen or lower alkyl; and p is from 0 to about 5. These organic polymers include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes including blends and grafts, wherein the rubber is a polybutadiene or a rubbery copolymer of about 98 to about 70 wt % styrene and about 2 to about 30 wt % diene monomer.

Polystyrenes are miscible with polyphenylene ether in all proportions, and any such blend can contain polystyrene in amounts of about 5 to about 95 wt % and most often about 25 to about 75 wt %, based on the total weight of the polymers.

In another embodiment, the thermoplastic resin comprises a poly(arylene ether) resin. Suitable poly(arylene ether) resins include those comprising repeating structural units having the formula

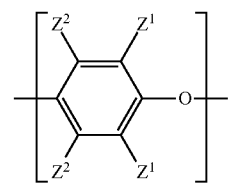

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a 3,5-dimethyl-1,4-phenyl group with the di-n-butylamine component of an oxidative polymerization catalyst.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present. The poly(phenylene ether) can be in the form of a homopolymer, a copolymer, a graft copolymer, an ionomer, or a block copolymer, as well as combinations thereof.

In some embodiments, the poly(arylene ether) comprises 2,6-dimethyl-1,4-phenylene ether repeating units, 2,3,6-trimethyl-1,4-phenylene ether units, or a combination thereof. In some embodiments, the poly(arylene ether) is a poly(2,6-dimethyl-1,4-phenylene ether), also known as polyphenylene oxide (PPO).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an intrinsic viscosity of 0.2 to 1 deciliter per gram measured at 25° C. in chloroform. Within this range, the poly(arylene ether) intrinsic viscosity can be 0.25 to 0.8 deciliter per gram, more specifically 0.25 to 0.7 deciliter per gram, even more specifically 0.3 to 0.65 deciliter per gram, yet more specifically 0.35 to 0.6 deciliter per gram.

The poly(arylene ether) resin can be blended with another resin. In one embodiment, the thermoplastic resin is a blend of a poly(arylene ether) resin with a polystyrene polymer, for example, a poly(2,6-dimethyl-1,4-phenylene ether)/polystyrene resin blend. Polystyrenes are miscible with polyphenylene ether in all proportions, and any such blend can contain polystyrene in amounts of about 5 to about 95 wt % and most often about 25 to about 75 wt %, based on the total weight of the polymers.

Examples of the polystyrene which can be blended with the poly(arylene ether) resin include homopolystyrenes, rubber-modified polystyrenes, unhydrogenated block copolymers of an alkenyl aromatic monomer and a conjugated diene, hydrogenated block copolymers of an alkenyl aromatic monomer and a conjugated diene, and combinations comprising at least one of the foregoing polystyrene resins.

In other embodiments, the thermoplastic resin comprises a polyamide resin. Polyamide resins, also known as nylons, are characterized by the presence of an amide group (—C(O)NH—). Examples of polyamide resins include polyamide-6, polyamide-6,6, polyamide-4,6, polyamide-11, polyamide-12, polyamide-6,10, polyamide-6,12, polyamide 6/6,6, polyamide-6/6,12, polyamide MXD,6 (where MXD is m-xylylene diamine), polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, and a combination thereof. In some embodiments, the polyamide comprises polyamide-6, polyamide-6,6, or a combination thereof.

Polyamides can be prepared by a number of known processes, and polyamides are commercially available from a variety of sources.

The amount of the thermoplastic resin used in the thermoplastic compositions of the present invention can be based on the selected properties of the thermoplastic compositions as well as molded articles made from these compositions. Other factors include the selected impact strength of the thermoplastic composition, the selected HDT of the thermoplastic composition, the amount and/or type of flame retardant used, the amount and/or type of the LDS additive used, or a combination including at least one of the foregoing factors. In one embodiment, the thermoplastic resin is present in amounts of from 15 to 85 wt. %. In another embodiment, the thermoplastic resin is present in amounts from 20 to 80 wt. %. In still another embodiment, the thermoplastic resin is present in amounts from 25 to 70 wt. %.

In addition to the thermoplastic resin, the compositions of the present invention also include a laser direct structuring (LDS) additive. The LDS additive is selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposed to a laser beam, metal atoms are activated and exposed and in areas not exposed by the laser beam, no metal atoms are exposed. In addition, the LDS additive is selected such that, after being exposed to laser beam, the etching area is capable of being plated to form conductive structure. As used herein "capable of being plated" refers to a material wherein a substantially uniform metal plating layer can be plated on laser-etched area and show a wide window for laser parameters.

In addition to enabling the composition to be used in a laser direct structuring process, the LDS additive used in the present invention is also selected to enhance the flame retardant characteristics of the composition. Many known flame retardants adversely affect the heat deformation temperature (HDT) and/or other mechanical properties of the composition (such as impact strength). As such, many flame retardant materials have less utility in structural type applications. However, by using an LDS additive that also enhances the flame retardant characteristics of the composition, less flame retardant is needed to achieve a selected flame retardancy, thereby enabling the compositions of the present invention to have HDTs and/or other mechanical properties that are similar to a polycarbonate-based resin having no flame retardant.

Examples of LDS additives useful in the present invention include, but are not limited to, a heavy metal mixture oxide spinel, such as copper chromium oxide spinel; a copper salt, such as copper hydroxide phosphate; copper phosphate, copper sulfate, cuprous thiocyanate; or a combination including at least one of the foregoing LDS additives.

In one embodiment, the LDS additive is a heavy metal mixture oxide spinel, such as copper chromium. The use of the heavy metal mixture oxide spinel enables the composition to be used in a laser direct structuring process while also enhancing the flame retardant characteristics of the composition such that lower amounts of a flame retardant are used, thereby improving the HDT and/or mechanical properties of the compositions. In one embodiment, the LDS additive is present in amounts of from 0.1 to 30 wt. %. In another embodiment, the LDS additive is present in amounts from 0.2 to 15 wt. %. In still another embodiment, the LDS additive is present in amounts from 0.5 to 8 wt. %.

As discussed, the LDS additive is selected such that, after activating with a laser, the conductive path can be formed by followed a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that can be used include, but are not limited to, gold plating, nickel plating, silver plating, zinc plating, tin plating or the like.

In addition to the foregoing components, the thermoplastic compositions of the present invention further include a flame retardant. In one embodiment, the flame retardant is a phosphorus containing flame retardant, for example an organic phosphate and/or an organic compound containing phosphorus-nitrogen bonds.

One type of organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. Other suitable aromatic phosphates can be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

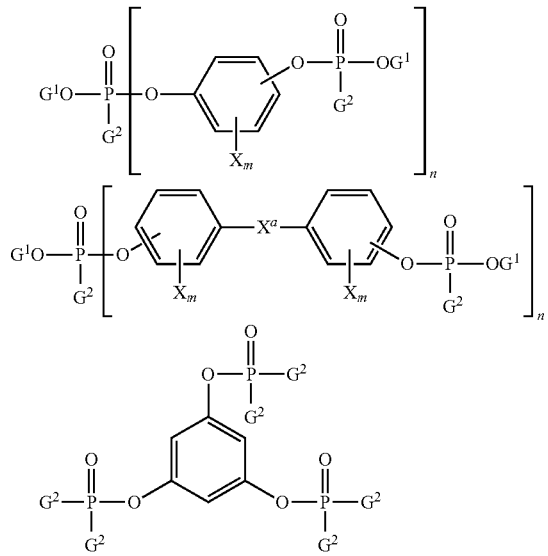

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m 0 to 4, and n is 1 to 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like. Methods for the preparation of the aforementioned di- or polyfunctional aromatic compounds are described in British Patent No. 2,043,083.

The amount of flame retardant added to the thermoplastic compositions of the present invention can be based on the amount and type of thermoplastic resin used, the amount and/or type of LDS additive used, and/or the amount and presence of other components in the thermoplastic compositions. However, as discussed, the use of certain flame-retardants can adversely affect certain properties of the thermoplastic compositions such as impact strength and/or the HDT. Accordingly, in the present invention, the amount of flame retardant in the thermoplastic composition is sufficient to impart flame retardant characteristics while still maintaining a selected impact strength and/or HDT. In one embodiment, the flame retardant is added in amounts up to 20 wt. %. In another embodiment, the flame retardant is added in amounts up to 15 wt. %. In still another embodiment, the flame retardant is added in amounts up to 10 wt. %.

The thermoplastic compositions of the present invention are essentially free of chlorine and bromine, particularly chlorine and bromine flame-retardants. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of polycarbonate, LDS additive and the flame retardant.

Optionally, inorganic flame retardants can also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF6$ or the like. When present, inorganic flame retardant salts are generally present in amounts of from 0.01 to 1.0 parts by weight, more specifically from 0.05 to 0.5 parts by weight, based on 100 parts by weight of polycarbonate-based resin, the LDS additive, and the flame retardant.

Anti-drip agents can also be included in the composition, and include, for example fluoropolymers, such as a fibril forming or non-fibril forming fluoropolymer such as fibril forming polytetrafluoroethylene (PTFE) or non-fibril forming polytetrafluoroethylene, or the like; encapsulated fluoropolymers, i.e., a fluoropolymer encapsulated in a polymer as the anti-drip agent, such as a styrene-acrylonitrile copolymer encapsulated PTFE (TSAN) or the like, or combinations including at least one of the foregoing antidrip agents. An encapsulated fluoropolymer can be made by polymerizing the polymer in the presence of the fluoropolymer. TSAN can be made by copolymerizing styrene and acrylonitrile in the presence of an aqueous dispersion of PTFE. TSAN can provide significant advantages over PTFE, in that TSAN can be more readily dispersed in the composition. TSAN can, for example, include 50 wt. % PTFE and 50 wt. % styrene-acrylonitrile copolymer, based on the total weight of the encapsulated fluoropolymer. The styrene-acrylonitrile copolymer can, for example, be 75 wt. % styrene and 25 wt. % acrylonitrile based on the total weight of the copolymer. Alternatively, the fluoropolymer can be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method can be used to produce an encapsulated fluoropolymer. Antidrip agents are generally used in amounts of from 0.1 to 1.4 parts by weight, based on 100 parts by of based on 100 parts by weight of the total composition, exclusive of any filler.

In addition to the thermoplastic resin, the LDS additive and the flame retardant, the thermoplastic compositions of the present invention can include various additives ordinarily incorporated in resin compositions of this type. Mixtures of additives can be used. Such additives can be mixed at a suitable time during the mixing of the components for forming the composition. The one or more additives are included in the thermoplastic compositions to impart one or more selected characteristics to the thermoplastic compositions and any molded article made therefrom. Examples of additives that can be included in the present invention include, but are not limited to, heat stabilizers, process stabilizers, antioxidants, light stabilizers, plasticizers, antistatic agents, mold releasing agents, UV absorbers, lubricants, pigments, dyes, colorants, flow promoters, impact modifiers or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methyl-phenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing can be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as antistokes shift dyes which absorb in the near infrared wavelength and emit in the visible wavelength, or the like; luminescent dyes such as 5-amino-9-diethyliminobenzo(a) phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Lastly, the compositions of the present invention can, in alternative embodiments, include one or more fillers. These fillers can be selected to impart additional impact strength and/or provide additional characteristics that can be based on the final selected characteristics of the thermoplastic compositions. Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

The fillers and reinforcing agents can be surface treated with silanes to improve adhesion and dispersion with the polymeric matrix resin. In addition, the reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of from 1 to 50 parts by weight, based on 100 parts by weight of the total composition.

In another embodiment, the thermoplastic compositions are of particular utility in the manufacture flame retardant articles that pass the UL94 vertical burn tests, in particular the UL94 V0 standard, which is more stringent than the UL94 V1 standard. Thin articles present a particular challenge in the UL 94 tests, because compositions suitable for the manufacture of thin articles tend to have a higher flow. Flame retardance of samples made from the thermoplastic compositions of the present invention is excellent. Using this standard, the thermoplastic compositions are formed into a molded article having a given thickness. In one embodiment, a molded sample of the thermoplastic composition is capable of achieving UL94 V0 rating at a thickness of 1.6 mm (±10%). In another embodiment, a molded sample of the thermoplastic composition is capable of achieving UL94 V0 rating at a thickness of 1.2 mm (±10%). In still another embodiment, a molded sample of the thermoplastic composition is capable of achieving UL94 V0 rating at a thickness of 1.0 mm (±10%). In yet another embodiment, a molded sample of the thermoplastic composition is capable of achieving UL94 V0 rating at a thickness of 0.8 mm (±10%).

The thermoplastic compositions of the present invention can be formed using any known method of combining multiple components to form a thermoplastic resin. In one embodiment, the components are first blended in a high-speed mixer. Other low shear processes including but not limited to hand mixing can also accomplish this blending. The blend is then fed into the throat of a twin-screw extruder via a hopper. Alternatively, one or more of the components can be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate can be one-fourth inch long or less as desired. Such pellets can be used for subsequent molding, shaping, or forming.

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like.

The present invention is further illustrated by the following non-limiting examples.

EXAMPLES

In the first two examples, PC/ABS compounds (available from SABIC Innovative Plastics) were tested using the same amount of flame retaradent (BDADP—available from Nagase Co. Ltd.). The LDS additive was copper chromium oxide spinel (available from Ferro Far East Limited). The formulations also included other additives—TSAN (from SABIC Innovative Plastics), mold release (PETS from Faci Asia Pacific PTE LTD), antioxidant (Irganox1076 from Ciba), stabilizer (IRGAFOS 168 from Ciba) and impact modifier (silicone-acrylic-based impact modifier META-BLEN S-2001 from Mitsubishi). For Sample A, the composition included 0.64% TSAN, 0.53% mold release, 0.085% antioxidant, 0.085% stabilizer and 4.25% impact modifier. For Sample B, the composition included 0.35% TSAN, 0.5% mold release, 0.08% antioxidant, 0.08% stabilizer and 4% impact modifier.

The samples were tested for their flame out time (FOT), which was measured according to UL 94 testing standards. In addition, the probablity of first time pass ("p(ftp)", and measured according to the methods set forth in U.S. Pat. No. 6,308,142) was also determined, with higher probabilities showing better flame retardant characteristics.

In the first sample, with 13.5 wt % BPADP, the flame out time (FOT) of 5 bars (thickness: 0.8 mm) under aging condition was 111.8 seconds, with the flame time of at least 4 bars out of 10 bars tested exceeding 10 seconds. But when 5 wt % of copper chromium oxide spinel was added, there were no bars that had a flame time that exceeded 10 seconds, with the longest FOT of 4.2 s. Furthermore, the FOT of 5 bars was only 17.3 seconds. That is to say the addtion of copper chromium oxide spinel as the LDS additive dramatically reduced the flame time, and therefore increased the flame retardancy, of the compounds. According to UL94 V0 regulation, sample A (w/o copper chromium oxide spinel) failed to pass V0 at 0.8 mm, while sample B (with 5 wt % copper chromium oxide spinel) passed V0 at 0.8 mm. The results can be seen in Table 1.

TABLE 1

| Formulation | | A | B |
|---|---|---|---|
| PC/ABS | % | 80.9 | 76.5 |
| BPADP | % | 13.5 | 13.5 |
| Copper chromium oxide spinel | % | | 5 |
| Others | % | 5.6 | 5 |

TABLE 1-continued

| Formulation | | A | B |
|---|---|---|---|
| FR property | | | |
| p(ftp) value | | 0.0002 | 0.99 |
| FOT (5 bars) | sec | 111.8 | 17.3 |

In the next two examples, it was shown that in order to meet UL94 requirement V0 at 0.8 mm, if no copper chromium oxide spinel was added to the compounds, at least 16.5 wt % of BPADP was needed. While if only 5 wt % copper chromium oxide spinel was added, 12.5 wt % of BPADP can pass, as shown in Table 2. Therefore, the LDS additive unexpectedly helped increase the FR performance of the compositions despite using lower amounts of FR, which enabled higher HDT to be achieved. For these samples, the types and amounts of the other additives is as follows—for Sample C, the composition included 0.622% TSAN, 0.518% mold release, 0.0829% antioxidant, 0.0829% stabilizer and 3.145% impact modifier; for Sample D, the composition included 0.606% TSAN, 0.505% mold release, 0.0808% antioxidant, 0.0808% stabilizer and 4.23% impact modifier.

TABLE 2

| Formulation | | C | D |
|---|---|---|---|
| PC/ABS | % | 79 | 77 |
| BPADP | % | 16.5 | 12.5 |
| Copper chromium oxide spinel | % | | 5 |
| Others | % | 4.5 | 5.5 |
| FR property | | | |
| p(ftp) value | | 0.86 | 0.86 |
| FOT (5 bars) | sec | 41 | 32.3 |
| HDT | C | 75.3 | 80.8 |

In the next set of examples, it was shown that in order to meet UL94 requirement V0 at 0.8 mm, if 8.0 wt % or 20.0 wt % copper chromium oxide spinel was added, 11.0 wt % or 10.0 wt % of BPADP can pass, as shown in Table 3. Therefore, the LDS additive unexpectedly helped increase the FR performance of the compositions despite using lower amounts of FR, which enabled higher HDT to be achieved. The results can be seen in Table 3. For these samples, the types and amounts of the other additives is as follows—for Sample E, the composition included 0.56% TSAN, 0.46% mold release, 0.07% antioxidant, 0.08% stabilizer and 3.05% impact modifier; for Sample F, the composition included 0.62% TSAN, 0.52% mold release, 0.07% antioxidant, 0.08% stabilizer and 4.15% impact modifier.

TABLE 3

| Formulation | | C | E | F |
|---|---|---|---|---|
| PC/ABS | % | 79 | 76.8 | 64.5 |
| BPADP | % | 16.5 | 11 | 10 |
| Copper chromium oxide spinel | % | | 8 | 20 |
| Others | % | 4.5 | 4.2 | 5.5 |
| FR property | | | | |
| p(ftp) value | | 0.86 | 0.95 | 0.95 |
| FOT (5 bars) | sec | 41 | 26.4 | 28.2 |
| HDT | C | 75.3 | 82.2 | 86.5 |

In the next set of examples, a separate LDS additive was used. In these examples, the LDS additive was copper hydroxide phosphate from Sigma Alrich. To achieve UL performance level of V0 at 0.8 mm, 15.0 wt % of BPADP is enough with only 5.0 wt % copper hydroxide phosphate in the compounds. As seen in Table 4, despite a lower amount of FR agent (BDADP), better FR performance was achieved through a lower flame out time and higher p(flp). For this sample, the type and amount of the other additives is as follows—for Sample G, the composition included 0.622% TSAN, 0.518% mold release, 0.0829% antioxidant, 0.0829% stabilizer and 3.345% impact modifier.

TABLE 4

| Formulation | | C | G |
|---|---|---|---|
| PC/ABS | % | 79 | 75.8 |
| BPADP | % | 16.5 | 15 |
| Copper hydroxide phosphate | % | | 5 |
| Others | % | 4.5 | 4.7 |
| FR property | | | |
| p(ftp) value | | 0.86 | 0.99 |
| FOT (5 bars) | sec | 41 | 27.1 |
| HDT | C | 75.3 | 76.5 |

In the next set of examples, a different flame retardant was used. In these examples, RDP from Supresta was used. With only 5.0 wt % copper chromium oxide spinel, V0 at 0.8 mm can be achieved with 13.5 wt % RDP in the compounds other than 16.5 wt % RDP. Again, as can be seen, lower amounts of RDP, when used in conjunction with the LDS additive unexpectedly resulted in comparable FR performance and higher HDT. These results can be seen in Table 5. For these samples, the types and amounts of the other additives is as follows—for Sample H, the composition included 0.622% TSAN, 0.521% mold release, 0.083% antioxidant, 0.083% stabilizer and 3.6% impact modifier; for Sample I, the composition included 0.622% TSAN, 0.521% mold release, 0.083% antioxidant, 0.083% stabilizer and 3.5% impact modifier.

TABLE 5

| Formulation | | H | I |
|---|---|---|---|
| PC/ABS | % | 78.6 | 76.7 |
| RDP | % | 16.5 | 13.5 |
| Copper chromium oxide spinel | % | | 5 |
| Others | % | 4.9 | 4.8 |
| FR property | | | |
| p(ftp) value | | 0.87 | 0.9 |
| FOT (5 bars) | sec | 24.3 | 26.1 |
| HDT | C | 68.3 | 73.3 |

In the next set of examples, 10.0 wt % copper chromium oxide spinel was added to PPO/RDP compounds to show that the effects previously shown are not limited to PC/ABS blends. The PPO came from SABIC Innovative Plastics. In these examples, it is seen that, again, lower amounts of RDP resulted in better FR performance when combined with the LDS additive. The results can be seen in Table 6. For these samples, the types and amounts of the other additives is as follows—for Sample J, the composition included 0.242% TSAN, 0.705% mold release, and 0.403% antioxidant; for Sample K, the composition included 0.228% TSAN, 0.665% mold release, and 0.38% antioxidant.

TABLE 6

| Formulation | | J | K |
|---|---|---|---|
| PPO | % | 83.4 | 78.7 |
| RDP | % | 15.2 | 10 |
| Copper chromium oxide spinel | % |  | 10 |
| Others | % | 1.4 | 1.3 |
| FR property | | | |
| p(ftp) value |  | 0.92 | 0.99 |
| FOT (5 bars) | sec | 32.1 | 28.6 |

While typical embodiments have been set forth for the purpose of illustration, the foregoing descriptions should not be deemed to be a limitation on the scope of the invention. Accordingly, various modifications, adaptations, and alternatives can occur to one skilled in the art without departing from the spirit and scope of the present invention.

What is claimed is:

1. A thermoplastic composition, comprising:
   a) from 70 to 85 wt % of a thermoplastic resin, wherein the thermoplastic resin comprises a polyamide resin;
   b) from 0.5 to 15 wt % by weight of a laser direct structuring additive, wherein the laser direct structuring additive is a copper chromium oxide spinel; and
   c) 0.1 to 15 wt % of a flame retardant, wherein the flame retardant comprises resorcinol bis(diphenyl phosphate), bisphenol A bis(diphenyl phosphate), or a combination thereof;
   wherein amounts are based on a total weight of the thermoplastic composition,
   wherein a molded sample of the thermoplastic composition is capable of achieving UL94 V0 rating at a thickness of 1.6 mm (±10%), and
   wherein laser activation of an area of the thermoplastic composition exposes and activates metal atoms of the laser direct structuring additive such that a metal plating layer can be plated on the area activated by the laser.

2. The composition of claim 1, wherein the polyamide resin comprises polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, or a combination comprising at least one of the foregoing polyamide resins.

3. The composition of claim 1, wherein a molded sample of the thermoplastic composition is capable of achieving UL94 V0 rating at a thickness of 1.2 mm (±10%).

4. The composition of claim 1, wherein a molded sample of the thermoplastic composition is capable of achieving UL94 V0 rating at a thickness of 1.0 mm (±10%).

5. The composition of claim 1, wherein a molded sample of the thermoplastic composition is capable of achieving UL94 V0 rating at a thickness of 0.8 mm (±10%).

6. The composition of claim 1, wherein the thermoplastic composition includes from 10 to 15 wt. % of the flame retardant, and the flame retardant comprises resorcinol bis(diphenyl phosphate).

7. An article of manufacture comprising the composition of claim 1.

8. The article of claim 7, wherein the article is selected from a personal computer, a notebook computer, a portable computers, a cell phone, or a personal digital assistant.

9. A method of forming a thermoplastic composition comprising the step of: blending in an extruder:
   a) from 70 to 85 wt % of a thermoplastic resin, wherein the thermoplastic resin comprises a polyamide resin;
   b) from 0.5 to 15 wt % of a laser direct structuring additive, wherein the laser direct structuring additive is a copper chromium oxide spinel; and
   c) 0.1 to 15 wt % of a flame retardant, wherein the flame retardant comprises resorcinol bis(diphenyl phosphate), bisphenol A bis(diphenyl phosphate), or a combination thereof;
   wherein a molded sample of the thermoplastic composition is capable of achieving UL94 V0 rating at a thickness of 1.6 mm (±10%), and
   wherein laser activation of an area of the thermoplastic composition exposes and activates metal atoms of the laser direct structuring additive such that a metal plating layer can be plated on the area activated by the laser.

10. The method of claim 9, wherein the polyamide resin comprises polyamide-6, polyamide-6,6, polyamide-4,6, polyamide-11, polyamide-12, polyamide-6,10, polyamide-6,12, polyamide 6/6,6, polyamide-6/6,12, polyamide MXD, 6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, or a combination comprising at least one of the foregoing polyamide resins.

11. The method of claim 9, wherein a molded sample of the thermoplastic composition is capable of achieving UL94 V0 rating at a thickness of 1.2 mm (±10%).

12. The method of claim 9, wherein a molded sample of the thermoplastic composition is capable of achieving UL94 V0 rating at a thickness of 1.0 mm (±10%).

13. The method of claim 9, wherein a molded sample of the thermoplastic composition is capable of achieving UL94 V0 rating at a thickness of 0.8 mm (±10%).

14. The method of claim 9, wherein the thermoplastic composition includes from 10 to 15 wt. % of the flame retardant, and the flame retardant comprises resorcinol bis(diphenyl phosphate).

* * * * *